United States Patent [19]

Lang

[11] 4,402,923
[45] Sep. 6, 1983

[54] PROCESS FOR MAKING PHOSPHORIC ACID

[75] Inventor: Warren H. Lang, Bartow, Fla.

[73] Assignee: Davy McKee Corporation, Lakeland, Fla.

[21] Appl. No.: 298,653

[22] Filed: Sep. 2, 1981

Related U.S. Application Data

[63] Continuation-in-part of Ser. No. 198,352, Oct. 20, 1980, abandoned, which is a continuation-in-part of Ser. No. 72,677, Sep. 5, 1979, abandoned.

[51] Int. Cl.³ .............................................. C01B 25/16
[52] U.S. Cl. .................................. 423/166; 423/167; 423/319; 423/320
[58] Field of Search ................ 423/166, 167, 319, 320

[56] References Cited

U.S. PATENT DOCUMENTS

| 3,326,635 | 6/1967 | Davenport et al. | |
|---|---|---|---|
| 3,485,580 | 12/1969 | Mischel et al. | 423/310 |
| 3,498,746 | 3/1970 | Smaltz et al. | |
| 3,498,747 | 3/1970 | Smaltz et al. | |
| 3,699,212 | 10/1972 | Palm | 423/319 |
| 3,803,293 | 4/1974 | Randolph et al. | 423/320 |
| 4,021,526 | 5/1977 | Gancy et al. | 423/206 T |
| 4,044,107 | 8/1977 | Houghtaling | 423/320 |

OTHER PUBLICATIONS

Babor, *Basic College Chemistry*, Second Edtion, Thomas Y. Crowell Co., (1953), pp. 255-257.

*Primary Examiner*—O. R. Vertiz
*Assistant Examiner*—Wayne A. Langel
*Attorney, Agent, or Firm*—Bernard, Rothwell & Brown

[57] ABSTRACT

A phosphate rock slurry, which may be used in the production of wet process phosphoric acid, is provided by wet grinding the rock with partially neutralized, acid water.

In one aspect, wet process phosphoric acid is made by advantageously recycling mineral acid waste water effluent of the process. All or a portion of the effluent can be at least partially neutralized with neutralizing agent, e.g., by contact with the base-forming constituents of phosphate rock or extraneous neutralizing agent, e.g., preferably ammonia, to provide a mixture which is wet ground to produce a processable slurry. In one particularly preferred aspect, all of the acid water is at least partially neutralized with phosphate rock and a portion of this acid water is advantageously further neutralized with an extraneous neutralizing agent. The slurry is provided by such neutralization at a pH compatible with the milling, e.g., grinding, media utilized. The use of acid water permits the use of mixtures having high solids content in the mill and thus also reduces the amount of water required to wet grind the mixture.

The wet ground processable phosphate rock slurry is advantageously used in the production of phosphoric acid and recycle mineral acid waste water effluent from the process is used in wet grinding phosphate rock and as part of the overall water balance control of the process.

60 Claims, 5 Drawing Figures

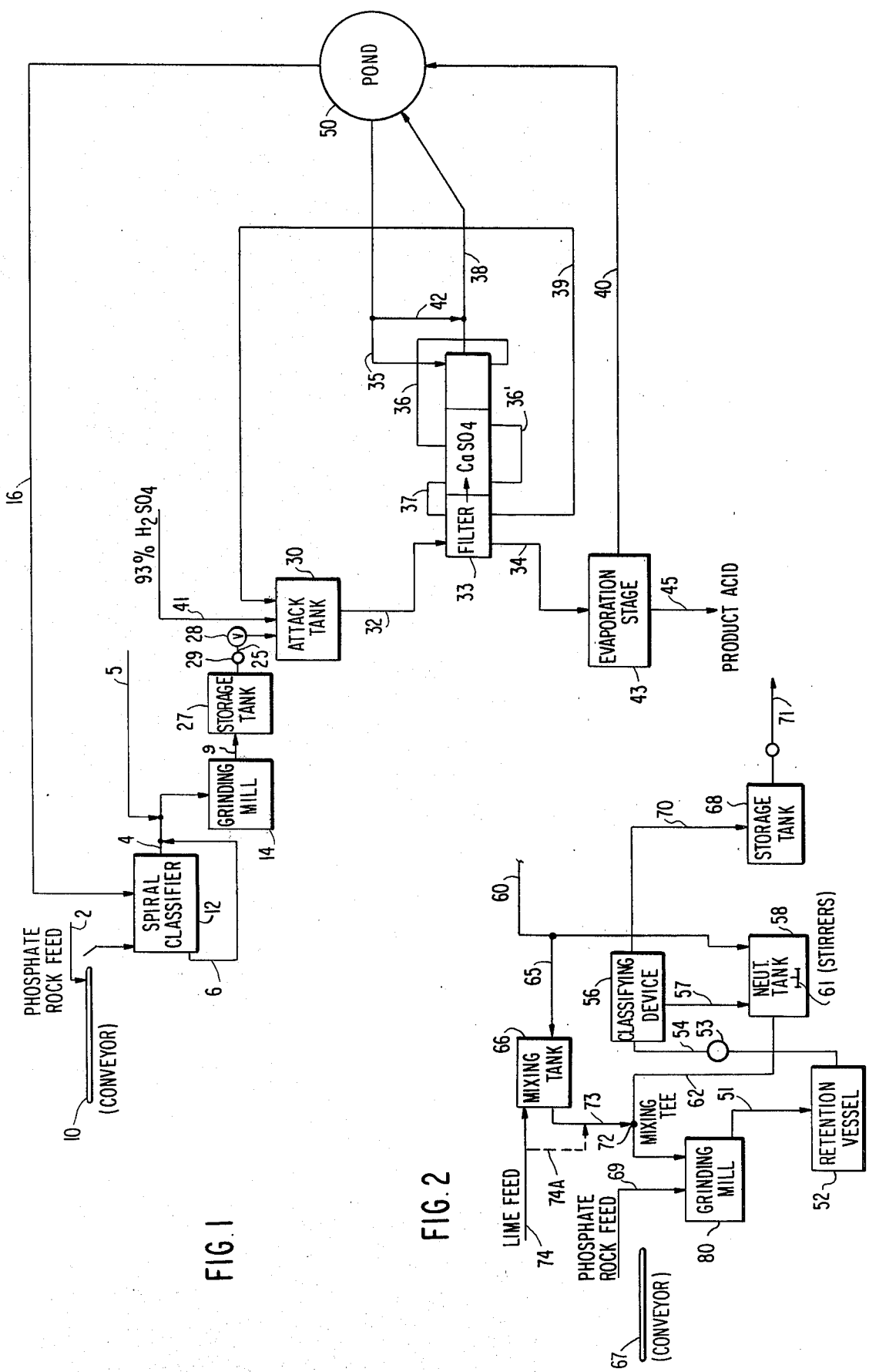

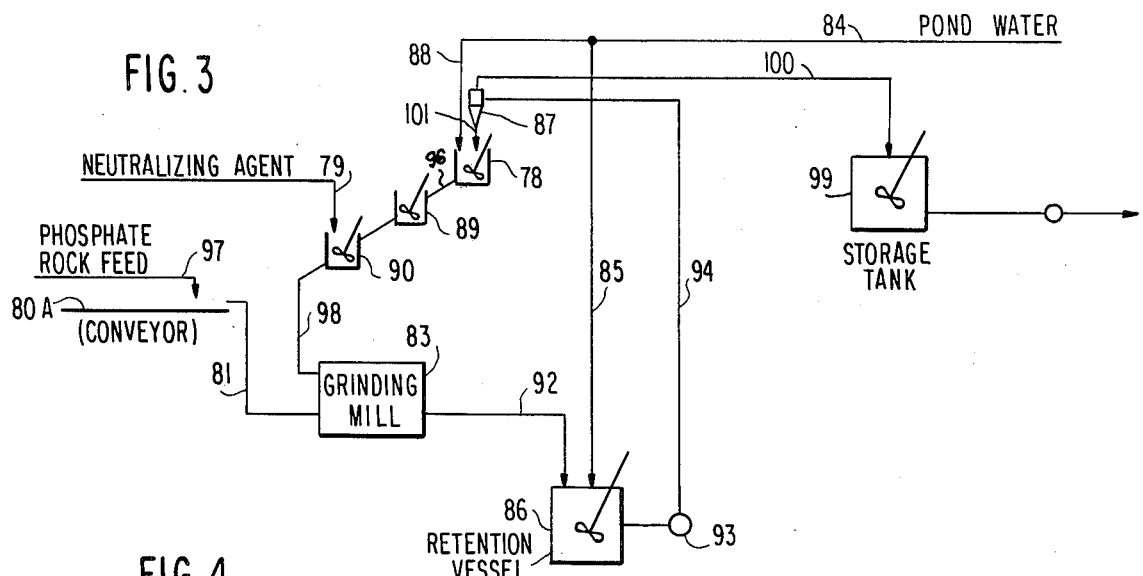
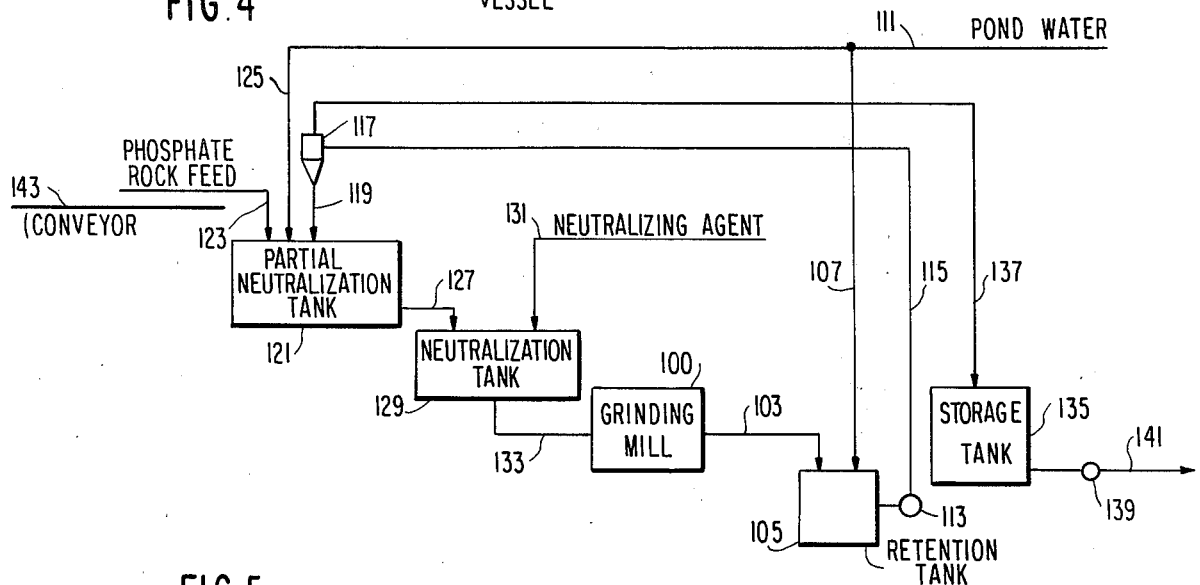
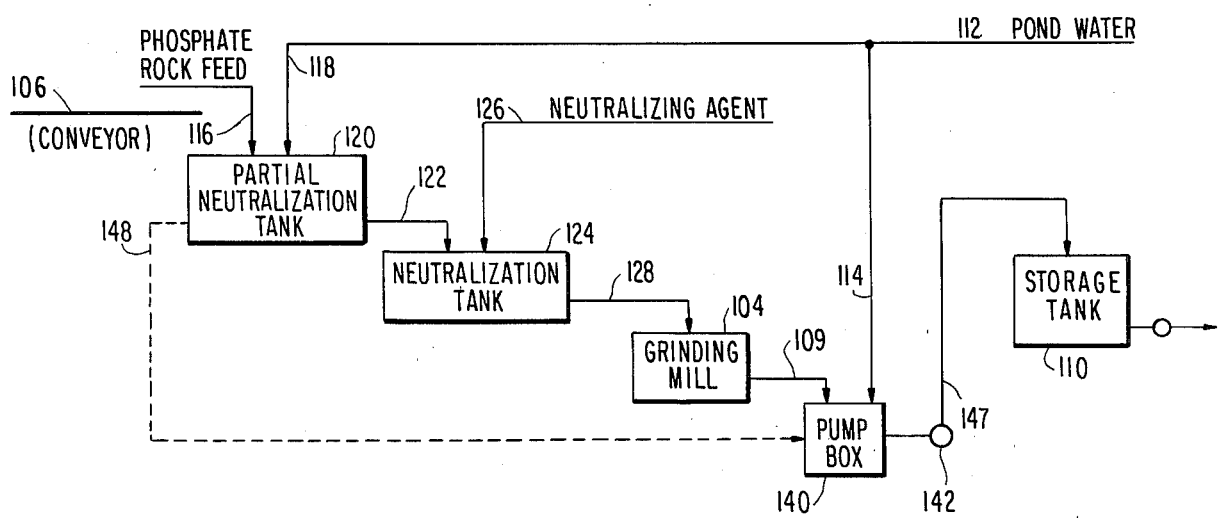

PROCESS FOR MAKING PHOSPHORIC ACID

THE INVENTION AND ITS BACKGROUND

This is a continuation-in-part of U.S. patent application Ser. No. 198,352, filed Oct. 20, 1980 (now abandoned), which in turn is a continuation-in-part of application Ser. No. 72,677, filed Sept. 5, 1979 (now abandoned).

This invention relates to a process for producing a slurry of wet ground phosphate rock with mineral acid water. It also relates to the manufacture of wet process phosphoric acid using this slurry and sulfuric acid. In a particular aspect, it concerns the advantageous utilization of mineral acid water, which is generally a waste water, for instance a waste water effluent obtained in the process, advantageously in wet grinding the phosphate rock and as part of the overall water balance control of the process.

Mineral acid water is frequently a by-product in chemical processing and its disposition as a waste water is costly and burdensome. In prior art processes for the production of phosphoric acid, the acidic waste water effluent from the process is passed to a storage pond or like storage facility. The waste water is generally acidic as the result of the presence of phosphoric acid, acidic fluorine compounds, and sulfuric acid. Due to environmental concern and governmental regulations, the level of acidity of the waste water effluents must be chemically treated, e.g., reduced in acidity by neutralization, prior to discharge into the environment beyond the battery limits of the plant.

In present commercial practice, plants discharging the waste water effluent beyond the battery limits, prepare the effluent for discharge into the environment by treating it in a two-stage liming system, i.e., two-pond, system to reduce fluorine and phosphate concentrations within acceptable environmental requirements for discharge. The acidic waste water is treated with lime in a first pond to achieve a pH in excess of 3.

In the second stage, lime is added to raise the pH level generally to at least 9 and the clarified effluent is back titrated with sulfuric acid to a pH of 7. Thus, this neutralization process, to prepare the waste water for disposal, presents an additional expenditure in the production of phosphoric acid by the wet process.

In accordance with the process of the present invention, this costly and wasteful disposal of the waste water is obviated in a technically viable and economically desirable manner. All or a portion of the acid waste water effluent, rather than being chemically treated for discharge to the environment, is advantageously and selectively used. This reuse of the acid waste water (e.g., pond water) from the process decreases the amount of waste water that must be stored or discharged into the environment, and, correspondingly, serves to reduce the amount of water supplied to the process from an extraneous source. Moreover, in reducing the amount of water required from an extraneous source, the treatment of waste water for disposal is correspondingly reduced. The reuse of waste water also serves to obviate the need to chemically treat it for disposal into the environment. Additionally, such reuse advantageously recycles and thus recaptures $P_2O_5$ values contained in the water which are otherwise lost in conventional processes wherein the waste water is neutralized and discharged from the battery limits of the plant.

In the process of the present invention, a phosphate rock slurry, which may be used in the production of wet process phosphoric acid, is produced by wet grinding the rock with phosphate rock-compatible, partially neutralized, acid water. A mixture of the phosphate rock and partially neutralized acid water is milled with milling means, e.g., grinding media, to a particle size to produce a processable slurry. The acid water can be at least partially neutralized (increase of pH), e.g., by contact with base-forming constituents contained in the phosphate rock or extraneous neutralizing agent, to provide a mixture which is wet ground to produce a slurry. The mixture is provided by such neutralization at a pH compatible with the grinding media utilized. The pH of the mixture, being acidic, is of a substantially reduced viscosity when compared to a water mixture without free ions and accordingly, the amount of water required to provide a mixture for wet grinding is substantially reduced and mixtures having a higher solids content can be wet ground. An extraneous neutralizing agent can be advantageously added to the mixture in conjunction with the base-forming constituents of the phosphate rock to aid in obtaining or adjusting this pH.

In a unique feature of the present invention, the base-forming constituents, otherwise considered as natural impurities, of phosphate rock are used to advantage. The phosphate rock feed is used to effect at least partial neutralization of mineral acid water, e.g., waste water effluent (e.g., pond water), to produce a mixture that is a suitable medium for wet grinding the rock to produce a processable rock slurry. The significant neutralization properties of the rock are even further and substantially enhanced when the surface area of the rock is increased, for instance by grinding the rock to expose the base-forming constituents for more and better contact with the acid water feed. This processable slurry can be used for reaction with phosphate rock-reactants, e.g., sulfuric acid to produce phosphoric acid.

The wet ground, processable phosphate rock slurry, when used in the production of phosphoric acid is contacted with sulfuric acid in an attack tank (reaction vessel) to produce a product slurry of crystalline hydrated calcium sulfate and phosphoric acid. The phosphoric acid product and solid calcium sulfate are separated, e.g., filtered. The calcium sulfate crystals are washed with water to recover additional values of phosphoric acid present with the crystals. The wash water is recycled to the attack tank. The calcium sulfate crystals are transported to a storage facility, e.g., pond. The pond contains water which includes acid waste water contained in the calcium sulfate crystals, condensate from evaporators (high in fluorine values), other utility water employed in the battery limits of the plant, and rain water falling within the battery limits of the plant. This pond water, rather than being discharged as acidic waste water effluent, is in a feature of the present invention, advantageously recyled for reuse to provide a mixture with the phosphate rock. The mixture is wet ground to produce a processable slurry. The use of wet, rather than dry, grinding provides several advantages: dust pollution is largely eliminated; rock drying is eliminated; conveying the resulting slurry is easier than transporting dry rock; but, most importantly, there is a significant savings in fuel costs.

The phosphate rock compatible, mineral acid water may vary in acidity. Generally, acidic waste water effluent such as acid pond water, for instance, may vary in acidity from a pH of about 0.3 to 3.5, depending upon climatic and plant operating conditions.

The increase of the pH level of the mineral acid water, e.g., waste water, in accordance with the present invention, to reduce the acidity of the mixture for wet rock grinding, nevertheless, due to its acidity, provides unique advantages. The utilization of at least partially neutralized acidic waste water in admixture with the phosphate rock for use in the wet grinding step of the process provides a free ion concentration in the phosphate rock and water mixture used in the grinding mill. This free ion concentration results in a corresponding decrease in the viscosity of the mixture. Generally, the higher the free ion concentration (the lower the pH), the more the decrease in viscosity. This decrease in viscosity permits the provision of mixtures having a higher solids content as grinding mixtures in the grinding mill and consequently, a decrease in the amount of the water otherwise utilized in the grinding step. Additionally, the lower mixture and slurry viscosities due to the free ion concentration, which permit the use of mixtures and slurries having a higher solids content in the grinding mill, improve grinding efficiency since the retention time of the slurry particles in the mill may be increased without decreasing the throughput of the process.

The increased retention time results in a reduction of the energy consumption by increasing the capacity of the mill. Moreover, the increased retention time achieves an improved ground rock slurry product for subsequent processing, e.g., contact and reaction with sulfuric acid to produce phosphoric acid.

Accordingly, in another unique feature, since the solids content of the slurries can be increased and thus reduce the water requirements for wet grinding, the total amount of acid waste water may be split; a first portion, at least partially neutralized, being utilized in the preparation of a mixture for the wet grinding step, and a second portion, non-neutralized, being elsewhere incorporated into the process, e.g., into the wet ground phosphate rock slurry after the grinding step. Consequently, only the portion of the acid waste water utilized in the grinding step need be pre-neutralized, thus resulting in a significant and concomitant saving in the amount of neutralizing agent used.

The phosphate rock basicity, as previously noted, is advantageously and selectively employed as a neutralizing agent in the present process. It is due to the presence of base-forming constituents, generally present in minor amounts, e.g., about 0.1 to 4%, and commonly considered impurities associated in varying amounts with beneficiated sedimentary phosphate rock. The natural state of these base-forming constituents include calcium carbonate, calcite, calcareous matter, dolomitic limestone, etc. For instance, calcium carbonate and dolomite are considered especially deleterious since they consume sulfuric acid in the reaction system. The presence of these base-forming constituents are, however, used to advantage in the present invention and serve to at least partially neutralize (increase of pH) all or a portion of the acid waste water used in the process. Further neutralization can be effected by incorporation of an extraneous neutralizing agent.

Neutralization is conducted to increase the pH and reduce the corrosive character of the acid water and make the phosphate rock-acid water mixture compatible, e.g., essentially noncorrosive, with the mill and milling media, e.g., grinding media used in the grinding step. The resulting mixture is more suitable for grinding the phosphate rock to produce a slurry for reaction with sulfuric acid since the corrosion problems of the otherwise highly acidic mixtures are alleviated for the grinding step.

The extraneous neutralizing agent (basic material) can be advantageously employed to further neutralize the acid water and further increase the pH of the rock-acid water mixture for compatibility with the grinding media. It can be incorporated into the acid water before, during or after mixing rock and mineral acid water to further increase or adjust the pH of the mixture.

Generally, it is desirable to provide a phosphate rock-acid water mixture for grinding at a pH of at least about 4.0 or 4.6 or higher, however, the pH of the resulting mixture preferably does not exceed about 6.5 and generally is not above 7. As the mixture or resulting slurry approach the isoelectric point at pH 7, the viscosity increases although the viscosity at pH 7 is still substantially less than that for a water medium not containing free ions; therefore, operating at a pH of 6.5 or below may permit the advantageous wet grinding of mixtures having a higher solids content. Moreover, the lower the pH of the product slurry, the more the digestion of the base-forming impurities in the rock will continue and thus enhance the release of $CO_2$, which is an undesirable foamer, before the slurry is introduced into a reaction system.

In addition, the minimum pH acceptable for grinding is desirable since it has a significant impact on economics. As a general matter, it is desirable to employ the minimum amount of extraneous neutralizing agent which will increase the pH of the mixture to one essentially noncorrosive under given milling (e.g., grinding) conditions. The use of a minimum pH has many advantages. It not only avoids the incurrence of the cost of the use of more than these amounts of neutralizing agent without compensating benefit, but it also maximizes the free ion concentration which results in the use of mixtures high in solids content for grinding; the manifold advantages of the latter being previously noted. For instance, wet grinding mills susceptible to corrosion may operate with a slurry pH of 4.6 or above. It is preferable to grind at a pH of 5.5 or higher to avoid or decrease the chemical corrosion of the metal, e.g., steel or steel alloy, grinding media. However, recent developments in the art, specifically the development of nickel-chrome steel alloy grinding media, may significantly reduce the acceptable pH permitting the use of mixtures having a higher acidity as compatible with corrosion-susceptible grinding media, for instance, to a pH of 4 or even lower.

The neutralizing agent (basic material) is generally used in small, effective pH-increasing amounts and may be a base such as lime, caustic, ammonia, or other suitable material. Ammonia is preferred, when the slurry is to be used in the production of phosphoric acid product, particularly if the acid product is to be employed in making an ammonium phosphate product such as diammonium phosphate.

The cost and molecular weight differentials significantly favor the use of ammonia, rather than say lime or caustic. Ammonia is particularly preferred since its use can avoid the total cost of lime or caustic, as well as the cost, when using lime or caustic, for the additional sulfuric acid needed to compensate for sulfuric acid they consume during reaction. Moreover, the ammonia values can be essentially entirely consumed when producing ammonium phosphate since the ammonia would also be serving as a required reactant.

The amount of ammonia employed can be a suitably small amount such that the yield of phosphoric acid and the process steps employed in its production are not unduly deleteriously affected. Although the amount of ammonia or other base added to the mixture containing phosphate rock and the waste water can vary, it is generally used in amounts sufficient to increase the pH value of the mixture to at least about 4.0, 4.6 or higher.

In an embodiment of the invention wherein all of the acid waste water conducted to the grinding circuit is utilized in the wet grinding step, the addition of ammonia required will be such that the phosphoric acid produced generally contains less than about 1 weight percent ammonia, e.g., about 0.1 to about 1 weight percent. Generally, this amount is in the range of about 0.15 to about 0.4 weight percent depending on the pond water analysis (acidity).

In another particularly advantageous embodiment, wherein the stream of acidic waste water is split, only a portion of the total acidic waste water used in the process is utilized in the wet grinding step, e.g., generally from about 10 to 90% and usually from about 50% to 90%, of the total acidic waste water. In this embodiment, when used in the production of phosphoric acid, less than about 0.5 weight percent of ammonia may end up in the filtered acid when a pH compatible with the grinding media is achieved. Preferably, this amount in the filtered acid is in the range of about 0.1 to about 0.3 weight percent depending on the pond water analysis.

In this "split stream" embodiment, the amount of ammonia or other extraneous neutralizing agent used is minimized in that it contacts only that part of the acidic waste water which is neutralized for use in the grinding mill. The other part can be incorporated into the wet ground product slurry for further processing and contribute to the overall water balance control in such further processing. For instance, when using the slurry in reaction with sulfuric acid to produce phosphoric acid, advantageously only a portion of the mineral acid water utilized is neutralized for use in the wet grinding of the rock and the remainder is used as part of the overall water balance control of the process. The splitting of the acid water can advantageously involve coaction between the provision of a phosphate rock slurry at minimum acceptable pH and maximum solids content. These joint factors coact to reduce the water and, correspondingly, neutralizing agent requirements, thus permitting bypass of more water to the reaction system, e.g., into the wet ground product slurry, rather than to the grinding step, while at the same time providing a product slurry at a lower acceptable pH, than that in the grinder. Moreover, the digestion of the base-forming impurities of the rock in the product slurry better continues at this lower pH and enhances the release of undesirable $CO_2$, a foamer, before the introduction of the slurry into the reaction system.

In another particularly advantageous embodiment of this invention, a coarse fraction of ground phosphate rock having an increased surface area over raw unground rock is employed to partially neutralize the acid water. The coarse (oversize) fraction, generally a portion of rock that will not pass from about a 20 to 35 mesh (Tyler) screen, can be mixed with the acid water, and the mixture is then wet ground to produce a slurry of phosphate rock. The surface area of the rock in this coarse fraction is substantially greater than the surface area of unground rock, significantly enhancing the exposure of the base-forming constituents of the rock to the acid water. The enhanced exposure significantly increases the degree and speed of the neutralization capacity of the rock, thereby significantly increasing the pH of the acid water to a higher pH in shorter time over that provided by corresponding unground rock.

The coarse fraction can be one from a particle size classifier separator employed to separate the wet ground slurry into a fine fraction, which is introduced into the reaction system, and a coarse (oversize) fraction, which is recycled to mix with, and partially neutralize, acidic water feed. The coarse fraction, for reasons previously noted, has a substantially increased neutralization effectiveness over corresponding unground rock. Its use as recycle significantly reduces the amount of extraneous neutralizing agent, e.g., ammonia required (consumed) to provide phosphate rock-acid water mixture at an acceptable pH for wet rock grinding.

The neutralizing agent, e.g., ammonia, consumption of the process for a given pond water is a function of both the degree of split employed and the extent of the pond water reaction with the rock. The percent of the pond water feed bypassed is dependent upon the operating parameters of the system, such as moisture in the fresh feed, mill slurry solids concentration, on the amount of total pond water make-up and the percentage bypassed. The rock-pond water reaction is a function of the amount and availability of the base-forming materials in the rock as well as the relative concentrations of the pond water contaminants. This recycle embodiment offers flexibility in operations allowing for the use of pond water either partially or as the total make-up water to the rock grinding system.

In another advantageous feature, a retention vessel can be employed following the grinding means and, when employed, before a classifier; the slurry of wet ground rock from the grinding step can be combined with a portion of unneutralized, raw acid water (e.g., the bypass water from stream splitting) in the retention vessel for introduction into the phosphoric acid-producing process without being subjected to and consuming extraneous neutralizing agent. In general, the larger the difference in solids content of the slurry in the grinding mill and in the retention tank, the larger the savings in neutralization agent required to maintain a given pH in the grinding mill. In this mode, essentially all of the product rock slurry from the grinding media, not only that rock originating from freshly ground rock but freshly ground recycle rock as well, can be treated with the acid water to reduce the pH of the wet ground product slurry while increasing the pH of the acid water. Moreover, the solids concentration of the product slurry is also reduced for convenient transport while allowing release of $CO_2$. This mode provides for maximum utilization of the base-forming constituents of the phosphate rock while using the acidity (even though undesirable from a corrosive standpoint) of, and per se, the waste water, to advantage. For instance, when in the grinding media, the mixture should be at a higher pH, e.g., pH 4.6 to 6.5, to be essentially noncorrosive while still acidic to maximize the solids content, e.g., to above about 65% and preferably to 73 to 80%, thereby minimizing the amount of water and, consequently, neutralizing agent, required to wet grind and produce a product slurry. In an integrated process using the product slurry for reaction with sulfuric acid to produce phosphoric acid, the wet ground product slurry is diluted, advantageously with a bypass stream of acid waste water, to a reduced solids content, e.g., about 60 to 72%, for transport to the attack tank not only as a reactant but also as part of the overall water balance control of the process. The pH is also concurrently reduced, e.g., to a pH of about 2.5 to 5.0, which is desired in the reaction system since at a higher pH, the sulfuric acid reactant would be less efficiently used. Thus, the retention vessel importantly serves as part of the processing of the slurry for use in the attack tank as well as in the processing of recycle of coarse phosphate rock as neutralizing agent in the wet grinding circuit.

In the process of this invention, the milling, e.g., grinding, of the slurry of the phosphate rock can be performed in conventional apparatus such as a ball mill, rod mill, or impact mill. The purpose of the grinding is to increase the surface area of the rock and thereby provide for a faster and more complete reaction of the rock with the phosphate rock reactants, e.g., sulfuric acid.

The extent of the grinding is preferably sufficient that a major portion of the comminuted rock will pass from about a 20 to 35, preferably 32, mesh (Tyler) screen. Most preferably, there is sufficient water present in the slurry in the grinder to render the slurry processable, e.g., transportable (pumpable). This will usually be at least about 20 or 22 weight percent based on the weight of the slurry. Included in this figure (water content) is whatever water, usually no more than 30 weight percent, say about 8 to 12 percent, that is present in the unground rock as it is received from the mine. It is generally wasteful to have more than about 35 weight percent water in the slurry, and the most advantageous range of water content during the grinding operation is about 20 to 35 or 40 percent.

After grinding, the slurry is passed to the attack tank from the grinding apparatus and may first be subjected to a size classification to assure that the phosphate rock in the slurry will essentially pass a 35 mesh (Tyler) screen. The slurry may be passed from the grinding apparatus, with or without the sizing classification step, to the attack tank at controlled rates by any known transport method.

The slurry of ground rock which is passed to the attack tank is admixed and reacted with sulfuric acid. The desired concentration of the sulfuric acid is determined by the desired strength of the phosphoric acid obtained from the attack tank. Generally, it will be desired to obtain a phosphoric acid having a $P_2O_5$ value of at least about 25, preferably about 28 to 32, weight percent, which will usually require using a sulfuric acid having a concentration of at least about 90 percent, preferably about 92 to 98 percent.

The water content, water balance control, in the attack tank slurry is essentially supplied by three ingredients: the rock slurry from the grinder, the concentrated sulfuric acid raw material, and the spent calcium sulfate wash water. Of the total amount of water added to the attack tank, usually no more than about 15%, say about 8 to 15%, is supplied by the concentrated sulfuric acid; about 15 to 35% is usually supplied by the slurry of ground rock; and about 50 to 85% is supplied by the recycled wash water. This points-up the character of this aspect of the invention directed to an integrated phosphoric acid manufacturing process involving not only the grinding of the phosphate rock in a partially neutralized acid water slurry, but also the manner in which such operation is incorporated in the overall process in which the source and amount of water from various sources are selectively provided. The production of a relatively strong phosphoric acid stream is maintained with savings on steam and evaporation costs.

Separation of the hydrated calcium sulfate crystals from the phosphoric acid mother liquor can be accomplished by conventional means, such as by filtration on a tilting pan vacuum filter. The separated crystals are then washed with water, preferably 2 or 3 times and preferably countercurrently in order to recover the phosphoric acid that has adhered to them. The washed calcium sulfate, or gypsum, is disposed of as waste material.

The following description of the drawings and examples are given merely to illustrate the invention and are not to be construed in a limiting sense. All parts, proportions and quantities are by weight unless otherwise indicated. The terms %, cp, and TPH are used to indicate percent by weight, centipoises, and tons per hour, respectively, in the specification and claims.

DESCRIPTION OF THE DRAWINGS

In the drawings,

FIGS. 1 and 2 are block diagrams depicting embodiments of the method of the present invention wherein all of the acidic waste water used in the process is utilized in the grinding step, and FIGS. 3, 4 and 5 are block diagrams of embodiments of the invention wherein only a portion of the acidic waste water used in the process is utilized in the grinding step.

DETAILED DESCRIPTION OF THE PREFERRED EMBODIMENTS

In one embodiment of the present invention presented diagramatically in FIG. 1, raw phosphate rock feed 2 having an approximate particle size wherein only a minor portion of the raw phosphate rock does not pass a 20 mesh Tyler screen and greater than about 75% of the rock feed does not pass a 35 mesh Tyler screen is transported by conveyor 10 to a spiral classifier 12. Classifier 12 facilitates contact of the raw phosphate rock with mineral acid water, e.g., acid waste water effluent of the process, which is conveyed from a retention pond or like storage area 50. The spiral classifier receives the phosphate rock feed 2 from conveyor 10 and the acid waste water effluent from the process via line 16. The acid waste water contacts and counter flows over the raw phosphate rock and is generally at least partially neutralized due to the basicity of the raw phosphate rock feed, and exits the spiral classifier 12 through line 6. When the mineral acid water is acid waste water, e.g., pond water, it may vary significantly in accordance with climatic or process conditions, for instance, from a pH of about 0.3 or 1.5 to 2 or 3.5. The amount of acid waste water employed in this phase of the process is generally dependent upon the basicity character and moisture content of the rock, the water balance of the process, the strength of the phosphoric acid desired, and the acidity of the waste water. It is employed in amounts compatible with the solids content and pH of the phosphate rock slurry to be ground. For instance, when at a pH of approximately 1.4 to 1.6, it is employed in amounts such that after contact with the raw phosphate rock, the pH is increased, for instance, above about 1.8 or 2.0 to approximately 2.2 to 2.4 depending on the amount of base forming material present in the phosphate rock or the amount of acid waste water added to the mill grinding step.

The partially neutralized acid waste water discharging over the classifier wier is transported via line 6 to line 4. The classifier product and partially neutralized acid waste water are further neutralized before entering the grinding mill 14, generally to a pH of about 4.0 to 4.6 or higher with a controlled flow of neutralizing agent, e.g., milk of lime, caustic, ammonia or like extraneous basic material from line 5. The grinding mill 14 may be a ball mill, rod mill, or other like mill for handling slurries as conventionally known in the art. It will be appreciated that the partially neutralized acidic waste water from the spiral classifier 12 discharged via line 6 could be fed directly to the two-stage pond neutralization process without recycling to line 4.

According to the process of FIG. 1, the phosphate rock, extraneous neutralizing agent, and partially neutralized waste water are fed into grinding mill 14 in a ratio necessary to provide an unground phosphate rock feed slurry of at least about 4.0 or 4.6 pH and to produce a ground phosphate rock slurry from mill 14 generally having more than 60% solids, approximately 60 to 65 or 75 or even more, e.g., 80% solids. It has been found that generally, if the solids content of the ground phosphate rock slurry is below about 65%, a water balance problem may be initiated which reduces the strength of the production acid or increases the acidic content of the waste water effluents in the process by higher acid losses to the filter waste gypsum cake. At a higher percent solids content in the grinding range, only a portion of the acidic waste water which can be used in the process may be introduced into the grinding step, the remaining portion being introduced into the process after the grinding step, see for example the embodiments presented in FIGS. 3 to 5.

After the grinding operation, the phosphate rock is transported to a surge storage tank 27 via line 9 prior to introduction of the ground phosphate rock slurry to the acidic attack tank or digestor 30. Generally the ground phosphate rock may have any approximate particle size wherein a majority of the ground rock will pass a 35 mesh Tyler screen with about 30% to 70% passing a 200 mesh Tyler screen.

The ground phosphate rock slurry is conveyed to the acid attack tank 30 by slurry pump 29 operating in co-operation with line 25, the flow of ground phosphate slurry being controlled by flow control valve 28. The ground phosphate rock slurry is contacted and reacted with sulfuric acid having a concentration of about 93% which is supplied to the attack tank 30 via line 41. Approximately 28% of the total water in the attack tank 30 comes from the slurry introduced via line 25 the balance of the water (in the range of 72%) comes from the filter wash water (acidic wash water) introduced via line 39, and about 12% from the concentrated sulfuric acid, preferably about 93% concentration, introduced via line 41.

As the reaction progresses in attack tank 30, crystals of hydrated calcium sulfate are formed in the reaction mixture. The reaction mixture is withdrawn from attack tank 30 via line 32 and is conducted to filter 33 for separation of the product phosphoric acid from the hydrated calcium sulfate crystals. The phosphoric acid filtrate, having a H$_3$PO$_4$ concentration of about 41 weight percent (equaling approximately 30% P$_2$O$_5$), and H$_2$O content of about 55% and containing abut 4% to 8% impurities, is removed from the system via line 34. If desired, the filtrate can be conducted to an evaporation stage 43 wherein it can be further concentrated, say to a strength of about 52% P$_2$O$_5$.

The condensate from the evaporation stage which is normally high in hydrofluorosilicic acid is discharged to the pond 50 by line 40. Alternatively, it can be conducted directly to spiral classifier 12 to take selective advantage of the neutralizing effect of the hydrofluorosilicic acid which is greater than that of either phosphoric or sulfuric acid. The concentrated product acid is removed from the evaporation stage 43 by line 45.

The hydrated calcium sulfate crystals on filter 33 are washed three times countercurrently with acid waste pond water supplied via line 35 from the gypsum waste pond 50. This acid waste pond water generally has P$_2$O$_5$ values in the range of about 0.01 to about 3.0%, not unusually in the range of about 1.0 to 2.0%, and frequently in the range of 1.6 to 1.8%. This weak acid filtrate passes to the final wash with the enriched waste water, through pipes 36, 36' and 37 in order to recover additional phosphoric acid adhering to the gypsum crystals in the initial and intermediate washings of the crystals. The washed gypsum waste material is then withdrawn from the filter system via line 38. The weak acid filtrate (spent wash water), having a P$_2$O$_5$ content generally in the range of about 16 to 23% is conducted via line 39 to the attack tank 30. The filter cake (gypsum dihydrate) contains about 35% moisture (acid waste water plus losses). This material is usually sluiced to the gypsum pond 50 by line 38 using additional acid waste pond water as the transport medium from line 42.

It will be appreciated by those of skill in the art that the use of acid waste pond water in the wet grinding step will allow the recovery of additional P$_2$O$_5$ values present in the acid waste water effluent. In the prior art, recovery of P$_2$O$_5$ values in the acid filter wash water effluent has been accomplished by recycling of the acid filter wash water into the attack tank 30. In the instant invention, additional P$_2$O$_5$ values present in the waste water effluent are recycled to the process by utilization of the acid waste water effluent in the wet grinding step of the process.

U. S. Pat. No. 4,004,107 discloses that fresh water is preferred for use in the wet grinding operation but recognizes that pond water or acid waste water effluent may be used in the grinding operation if special precautions are taken to protect the mill and the grinding media from excessive corrosion. Due to prior partial neutralization of the acid waste water, the instant invention allows the use of the acid waste water without requiring special precautions to prevent excessive corrosion of the mill and/or the grinding media in the rock grinding operation. The acid waste water is partially neutralized by contact with the raw phosphate rock, with further neutralization being effected with the addition of neutralizing agents such as lime, caustic, ammonia, or like basic materials.

A grinding mill can be operated at a pH lower than about 6, however, corrosion of the steel grinding media increases to a point where it is not considered economical or practical. To operate a grinding mill below about 4.6 pH, the grinding medium should be other than steel or steel alloy, with the possible exception of some recently developed nickel-chrome steel alloy grinding media, due to the high chemical corrosion rates of these materials in an acidic environment. The usual substitutes are ceramic or stone grinding media which have less weight than metal and therefore require larger mills or more mills to equal the fineness of the grind realized with steel alloy grinding media. For mill operation below about 7 pH it is usually prudent to protect the mill shell from corrosive attack by installing a rubber liner or a corrosive resistant liner underneath the corrosive resistant impact liners. The mill trunnions should also be protected.

It should be noted that it is not necessary to supply all the water requirements for wet rock grinding as acidic waste water. If maximum waste water is used as shown in the embodiment of FIG. 1, approximately 30% of the water requirement will be present as normal moisture in the undried raw phosphate rock feed with the remaining 70% being acid waste water or a mixture of acid waste water and fresh water. The most efficient and economical mixture of acid waste water with fresh water will be dependent upon the specific chemical properties of the raw phosphate rock feed.

A second embodiment of the invention is diagramatically presented in FIG. 2. This embodiment utilizes a partially-ground fraction of phosphate rock in the acid waste water neutralization step which rock, due to its increased surface area compared to the raw phosphate rock, advantageously provides an improved neutralizing capability.

As shown in FIG. 2 the ground phosphate rock slurry from grinding mill 80, which may be any conventional grinding mill as in the first embodiment described above, is conveyed by line 51 to retention vessel 52. Cooperating pump 53 and conduit 54 transport the slurry from retention vessel 52 to particle size classifying device 56, which may be a hydrocyclone, vibrating screen, settling tank with overflows or other like particle size separating apparatus. The coarse (oversize) portion of the ground phosphate rock which generally has a large portion, e.g., about 5 or 20 to 35% or 80%, which is greater than 35 mesh (Tyler) and virtually all of which e.g. about 85% or more, is greater than 400 mesh (Tyler), is separated and conveyed via line 57 to acid waste water neutralization tank 58. The coarse portion contacts the acid waste water transported by line 60 from a retention pond (not shown) to other like retention facility for the storage of the acid waste water from the process. At introduction the acid waste water has a pH and $P_2O_5$ content in the range as defined above. Neutralization tank 58 has agitators or stirrers 61 to keep the material in suspension for later transport reasons. The coarse fraction of the phosphate rock and acid waste water may be retained in the neutralization tank 58 for a suitable neutralization reaction period say of about 2 minutes to a few hours, normally from about 5 to 40 minutes, to allow sufficient contacting of the acid waste water and partially ground phosphate rock to attain a pH of approximately 2.3 or higher depending on the amount of base-forming material present in the phosphate rock and the amount of acid waste water added. The coarse rock fraction and partially neutralized waste water are transported by line 62, e.g., a cooperating pump and conduit, to mixing tee 72. Prior to introduction of the coarse rock fraction and partially neutralized waste water into the grinding mill 80, a baseforming material such as milk of lime, caustic, ammonia, or other like basic material can be added via line 73 to raise the pH of the slurry to about 4.6 or higher. At mixing tee 72 the partially neutralized waste water in line 62 is mixed with pond water from line 65 which has been mixed with lime, caustic, ammonia, or like basic materials in mixing tank 66. The lime, caustic, ammonia, or like basic material is introduced to the mixing tank 66 by line 74. Basic materials by line 74A can bypass mixing tank 66 and flow directly to mixing tee 72. Raw unground phosphate rock is fed by line 69 from conveyor 67 and charged into the grinding mill 80. The recycle rate of coarse ground phosphate rock and partially neutralized waste water from neutralization tank 58 to grinding mill 80 via line 62 may be from about 10% to 200% or 350% of the feed rate of raw phosphate rock conveyed by conveyor 67 to the grinding mill 80.

The fine portion of the phosphate rock slurry from particle separator device 56, preferably having a solids content of from about 65 to 70%, is transported to ground rock slurry storage tank 68 by line 70 for surge storage prior to introduction of the ground rock slurry to the attack tank or digestor (not shown). The ground rock slurry is conveyed to the acid attack tank by line 71, e.g., a cooperating pump and conduit, where it is contacted with sulfuric acid to form a product slurry of phosphoric acid and hydrated crystalline calcium sulfate in accordance with the same method disclosed in the first embodiment above described. The phosphoric acid of the product slurry is then separated from the calcium sulfate by means as disclosed in the first embodiment.

A further advantage of the instant invention, in addition to utilization via recycling of the acid waste water, is the decreased viscosity of the slurry of ground phosphate rock due to the lowered pH (e.g., lower than 7) of the slurry, i.e., increased free ion concentration in the slurry, through use of the acidic waste water. It has been found that the viscosity of a phosphate rock slurry containing 68% solids, having a pH of about 7, can be lowered from a typical viscosity of about 3200 cp to 1500 cp or less depending upon the operating pH (free ion concentration) of the resulting ground phosphate rock slurry. For example, a ground rock slurry containing 67.5% solids and 19.5% acidic waste water, having pH of about 1.4 to 1.6, and titrated with NaOH to a pH of about 6, has a viscosity of about 1600 cp whereas at a pH of about 7, with less free ions present, the slurry has a viscosity of about 2750 cp. The lowering of the viscosity of the slurry enables, advantageously, the use of a slurry having a correspondingly higher solids content in the grinding mill at higher percent solids, say at a solids content of about 75 to 80%, instead of a typical 68% solids. The use of slurries having a higher solids content in turn improves the grinding efficiency due to an increased retention time of the slurry particles in the mill. Also, mill operation with slurries having a higher solids content requires less acid water addition and consequently less neutralizing agent to maintain an acceptable pH in the mill. To maintain the desirable phosphoric acid strength in the phosphoric acid plant, the remaining acid waste water which does not require neutralization can be added to the process after the grinding step, as discussed in the preferred embodiments presented in FIGS. 3 through 5. As noted above, when the solids content of the phosphate rock—acid waste water mixture is greater than about 68% it may be particularly advantageous to utilize only a portion of the total acid waste water in the grinding step. FIG. 3 is a modification of the embodiment presented in FIG. 2, in which only a portion of the acid waste water is utilized in the grinding step.

As shown in FIG. 3, the ground phosphate rock slurry from grinding mill 83 having a preferred solids content from about 65 to about 80% is conveyed by line 92 to retention vessel 86. The ground rock contacts a first portion of the acid waste water stream 85 transported by line 84 from a retention pond or other like retention facilities for the storage of the acid water from the process. At introduction the acid waste water has a pH generally in the range of between 0.3 and 3.5 and a $P_2O_5$ content generally in the range of 0.01% to 3.0%. Stirrer or agitation means are depicted in each of the vessels presented in FIG. 3. Cooperating pump 93 and conduit 94 transport the slurry from the retention vessel 86 to particle size classifying device 87, which may be a hydrocyclone, vibrating screen, settling tank with overflows or other like particle size separating apparatus. The coarse portion of the ground phosphate rock generally has a large portion, constituting about 8 to 80% of the ground phosphate rock, which portion is generally greater than 35 mesh (Tyler), is separated and conveyed via line 101 to acid waste water neutralization tank 78. The coarse portion contacts a second portion of the acid waste water stream 88 transported from line 84. Neutralization tank 78 as well as tanks 86, 89 and 90 may have agitators or stirrers to keep the material in suspension for later transport reasons and to promote contacting of the phosphate rock and acidic waste water. The coarse rock fraction and partially neutralized waste water are transported by line 96 generally at a pH between 2.4 and 4 to a degasing retention tank 89 where $CO_2$ existing in the slurry evolves under retention time conditions sufficient to release $CO_2$ and this time can range from about 1 minute to a few hours, generally from about 5 to 40 and usually from about 5 to 15 minutes. The slurry is generally retained in the neutralization tank 78 for a period of about 2 minutes to a few hours. Under extended retention time conditions in the neutralization tank 78, say 6 minutes to a few hours, the need for a separate degasing tank 89 will not generally be required since the $CO_2$ release can be effected in tank 78. It is advantageous to release $CO_2$ from the slurry not only because it is a foamer, but selectively at this point before extaneous neutralizing agent, particularly when it is ammonia, is added. Unless the $CO_2$ is substantially released, ammonia values are lost since it reacts with $CO_2$ to produce $NH_4(CO_3)_2$. The release of $CO_2$ is a result of the normally undesirable base-forming ingredients in the coarse fraction of the rock being used to advantage to partially neutralize the acid water. This selective neutralization—$CO_2$ release serves to use the base-forming constituents to advantage while avoiding or minimizing the deleterious effect of $CO_2$ production.

Prior to introduction of the coarse rock fraction and partially neutralized second portion of the acid waste water into the grinding mill 83, a base-forming material, preferably ammonia can be advantageously added via line 79 to raise the pH of the slurry to any desired pH, e.g. 4.0 to 4.6 or higher. This can be done in a final neutralization tank 90.

Raw phosphate rock is fed by line 97 to conveyor 80A and charged into the grinding mill 83. The recycle rate of coarse ground phosphate rock and partially or fully neutralized waste water from final neutralization tank 90 to grinding mill 83 via line 98 may be from 10% to 250% or 350% of the feed rate of raw phosphate rock conveyed by conveyor 80 to the grinding mill 83.

The fines portion of the phosphate rock slurry from particle sizing separator device 87, preferably having a percent solids in the range of from about 65 to 80%, and a pH normally above about 3.0 is transported to ground rock slurry storage tank 99 by line 100 for surge storage prior to introduction of the ground rock slurry to the attack tank (not shown).

Some of the advantageous features provided by "stream splitting" are presented in Table I. When stream splitting is not employed, see Run #1, (0% water to the retention vessel) it requires approximately 1.45 times as much $NH_3$ to neutralize 1000 gallons of acid waste water having a pH of 1.0 to neutralize the waste water to a pH of 6.0 than would be required absent the phosphate rock contacting preneutralization step set forth in the embodiment of FIG. 3. In addition, by using the preneutralization step, 14%, 28%, and 42%, see column 5 of Runs #2, 3, and 4, respectively, of the total acid waste water advantageously avoids contact with, and therefore, consumption of, extraneous neutralization agent ($NH_3$).

TABLE I

Pounds of $NH_3$ required to neutralize 1000 gallons of 1.0 pH acidic waste water when the preferred embodiment of FIG. 3 is operated with 57% recycle from particle size classifying device 87.

| 1 Run # | 2 pH in the Grinding Mill | 3 pH in the Retention Vessel | 4 % of Total Acid Waste Water Added to the Retention Vessel | 5 % of Total Waste Water in System Avoiding Contact With $NH_3$ | 6 Pounds of $NH_3$ If Phosphate Rock Pre-Neutralization Used | 7 Pounds of $NH_3$ If No Phosphate Rock Pre-Neutralization Used |
|---|---|---|---|---|---|---|
| 1 | 6.0 | 6.0 | 0% | 0% | 71 lbs. | 103 lbs. (1.45 additional) |
| 2 | 6.0 | 5.6 | 20% | 14% | 63 lbs. | 103 lbs. (1.63 additional) |
| 3 | 6.0 | 5.3 | 40% | 28% | 60 lbs. | 103 lbs. (1.72 additional) |
| 4 | 6.0 | 4.5 | 60% | 42% | 46 lbs. | 103 lbs. (2.24 additional) |

Thus additional base reagent savings can be effected by the technique of adding varying portions of the acid waste water to the retention vessel 86. For example, when operating the mill with a 57% recycle rate as presented in Table 1 and outlined in FIG. 3, and while adding 60% of the acid waste water as a first portion to the retention vessel 86 tank, the use of basic reagent is reduced by approximately 42% over the process presented in FIG. 2 wherein all of the acid waste water is utilized in the grinding step.

Another method for an additional nominal (e.g., 10%) base reagent savings can be realized by adding the raw phosphate rock to neutralization tank 78 (along with the coarse fraction from conduit 101 and the acid waste water stream 88) instead of directly to grinding mill 83 via conduit 81. This arrangement allows the acidic waste water stream 88 to react with and be partially preneutralized by the raw phosphate rock.

In the embodiment of FIG. 3, if a grinding mill product is desired with about 4% +35 mesh (Tyler) and a slurry content of 68% solids, the amount of mill recycle in the operation is dictated by a number of variables such as particle size of feed rock, feed rock rate, mill size, and type and size of particle size classifier separator installed.

Table II indicates the percentage of total acid waste water in the embodiment of FIG. 3 which bypasses directly to the phosphoric acid plant digestion step from particle size classifying device 87 without making contact with base reagents or mill grinding media, as a function of varying grinding mill recycle rates.

TABLE II

| Percent Mill Recycle Rate | % of Total Acid Waste Water Added to the Retention Vessel | % of Total Acid Waste Water By-Passing to Phosphoric Acid Plant Requiring No Neutralization |
| --- | --- | --- |
| 10 | 60 | 53 |
| 57 | 60 | 42 |
| 100 | 60 | 35 |
| 150 | 60 | 30 |
| 250 | 60 | 23 |

When employing a closed circuit grinding mill operation, as exemplified by the embodiment of FIG. 3, the advantages of a retention vessel ahead of the classification step are made obvious based on the percentage of total acid waste water bypassing directly to the phosphoric acid plant facilities without requiring final neutralization with base reagents. The pH of the fines discharging from the classifier 87 to the slurry storage tank 99 will be in the range of about 3 to 6 pH depending on the amount of acid waste water added to the retention vessel and the amount of base-forming constituents present in the phosphate rock feed. Surfaces coming into contact with the acid bearing water such as pumps, slurry lines, agitators, classifiers and vessels can be protected with acid resistant linings or coatings made out of acid resistant material.

Another embodiment of the invention is diagramatically presented in FIG. 4. This embodiment utilizes a partially ground fraction of phosphate rock along with the raw phosphate rock in the acid waste water neutralization step which ground rock, due to its increased surface area compared to raw phosphate rock, advantageously provides an improved neutralizing capability.

As shown in FIG. 4, the ground phosphate rock slurry from grinding mill 100 having a preferred solids content of from about 65 to 80% is conveyed by line 103 to retention vessel 105. The ground rock contacts a first portion of the acid waste water from stream 107 transported by line 111 from a retention pond or other like retention facility for the storage of the acid water from the process. At introduction, the acid waste water generally has a pH in the range of between 0.3 and 3.5 and a $P_2O_5$ content generally in the range of 0.01% to 3%. Cooperating pump 113 and conduit 115 transport the slurry having a preferred solids content of about 67 to 75% from the retention vessel 105 to particle size classifying device 117, which may be a hydrocyclone, vibrating screen, settling tank with overflows or other like particle size separating apparatus. The coarse fraction of the ground phosphate rock generally constitutes about 8 to about 80% of the ground phosphate rock, which fraction is generally greater than 35 mesh (Tyler). This coarse fraction is separated and conveyed via line 119 to acid waste water partial neutralization tank 121. The coarse fraction from line 119 and the raw phosphate rock 123 contact the acid waste water from stream 125 (transported from line 111) in the partial neutralization vessel 121 and the acid water is partially neutralized. The recycle rate of coarse ground phosphate rock from line 119 may be from 10% to 250% or 350% of the feed rate of raw phosphate rock introduced from line 123.

The mixture of coarse rock fraction from line 119, the raw phosphate rock from line 123, and partially neutralized waste water from line 125 are transported from vessel 121 by line 127 at a pH in the range of about 1.6 and 5.5 to a final neutralization vessel 129 where a base-forming material such as ammonia or other like base material can be added via line 131 to raise the pH of the slurry to any desired pH say 4.0 to 4.6 or higher. Product from the final neutralizing tank 129 is conveyed by conduit 133 to grinding mill 100.

The fine fraction of the phosphate rock slurry from particle sizing separator device 117, preferably having a solids content from 65 to 75% and a pH in the range of about 3 to about 6 is transported to ground rock slurry storage tank 135 by line 137 for surge storage prior to introduction of the ground rock slurry to the attack tank (not shown) by cooperating pump 139 and conduit 141.

A further embodiment of the invention is shown in FIG. 5. The ground phosphate rock slurry product from grinding mill 104 having a preferred solids content of from 66 to 80% is conveyed by line 109 to pump box (retention vessel) 140. The ground rock in pump box 140 contacts a first portion of the acid waste water stream transported by line 112 via conduit 114 from a retention pond to other like retention facility for the storage of the acid water from the process. The acid waste water from the retention pond generally has a pH in the range between 0.3 and 3.5 and a $P_2O_5$ content in the range of between about 0.01% to 3%. The slurry is transported by conduit 147 with cooperating pump 142 to storage tank 110 where the slurry is held for subsequent transmission to the attack tank (not shown).

The raw phosphate rock from line 116 contacts a second portion of the acid waste water stream from line 118 (transported from line 112) in the neutralization vessel 120 where it generally has a retention period of from about 2 to 7 or 14 minutes.

The mixture of raw phosphate rock and partially neutralized waste water from vessel 120 are transported by line 122 at a pH between about 1.6 to about 5.5 to a final neutralization vessel 124 where a base-forming material such as ammonia or other like base material can be added via line 126 to raise the pH of the slurry to any desired pH, say 4.0 to 4.6 or higher. Product from the final neutralization vessel 124 is conveyed by conduit 128 to grinding mill 104.

Other variations for acid waste water addition can be accomplished if desired. For instance, all of the acid waste water from line 112 can be added to the partial neutralization vessel 120 with the excess overflowing an end wier, the excess may be conducted via line 148 directly to pump box 140.

When the phosphoric acid produced in accordance with the process of the invention is to be used for the production of an ammonium phosphate such as diammonium phosphate (DAP), advantageously a portion or all of the extraneous basic material introduced, e.g., by line 5 of the first embodiment in FIG. 1 or line 74 of the second embodiment in FIG. 2, to increase the pH of the slurry to about 4.0 or 4.6 or greater, may be ammonia. As earlier disclosed the ammonia can be used to achieve neutralization of the pond water to a pH of at least about 4.0 or 4.6 after the pond water is contacted with the phosphate rock and preferably, prior to passing the pond water and phosphate rock to the grinding mill.

In the production of an ammonium phosphate the use of ammonia as the extraneous basic material to neutralize the pond water to a pH of about 4.0 or 4.6 or higher achieves a significant reagent cost saving. The ammonia used for partial neutralization remains in solution form in the process, being present in the range of about 0.1 to about 1.0%, preferably about 0.15 to about 0.4%, in the phosphoric acid produced when all of the acidic waste water is utilized in the grinding step, e.g., the embodiments of FIGS. 1 and 2. When only a portion of the acidic waste water is utilized in the grinding step, e.g., the embodiments shown in FIGS. 3 to 5, the ammonia used for neutralization in the process may be present in the range of about 0.01 to 0.5%, preferably in the range of about 0.1 to about 0.3%. The ammonia present in the final phosphoric acid product reduces the amount of ammonia necessary for the production of an ammonium phosphate by the reaction process. The use of ammonia as an extraneous basic material realizes further reagent savings since the milk of lime, which would generally be used as the partial neutralization agent would not participate in the subsequent reaction to form the ammonium phosphate and further additional sulfuric acid would have to be used in the phosphoric acid digestion step to convert the added calcium to gypsum.

Table III below gives a typical Tyler screen size distribution for raw phosphate rock used in the preferred embodiments and the particle size distribution for the coarse portion of ground rock conveyed to the neutralization tanks in the embodiments presented in FIGS. 2 to 5, e.g., tank 58 by line 57 in the second preferred embodiment presented in FIG. 2.

TABLE III

| Tyler Mesh | Screen Size Distribution (Cumulative) | |
|---|---|---|
| | Raw Rock | Coarse Rock Portion (Recycle) |
| +½ inch | Trace | |
| +3 | 12 | |
| +6 | 24 | |
| +20 | 59 | 16 |
| +28 | 74 | 23 |
| +35 | 92 | 31 |
| +65 | 98.1 | 55 |
| +100 | 98.3 | 68 |

TABLE III-continued

| Tyler Mesh | Screen Size Distribution (Cumulative) | |
|---|---|---|
| | Raw Rock | Coarse Rock Portion (Recycle) |
| +200 | 98.5 | 85 |
| +325 | 98.5 | 94 |
| −325 | 100 | 100 |

It will be appreciated that the coarse portion of ground phosphate rock has approximately 4 times the surface area of the raw rock on an equal weight basis. The increased surface thereby increases the neutralization capability of the ground rock in the embodiments presented in FIGS. 2 through 4 as opposed to the raw rock of the embodiment presented in FIG. 1, assuming the presence of equal amounts of base-forming constituents present in the raw rock of both embodiments. The raw rock is ground to increase its surface area and generally it is ground to increase its surface area from about 2 to 20, usually from about 3 to 6, times the surface area of the raw feed.

It has been found that the use of the base-forming properties in the phosphate rock feed to partially neutralize the acid waste water effluent of the process can reduce by about 50% the required amount of ammonia necessary to achieve an acceptable pH, e.g., a pH of about 6.0 for wet rock grinding versus a required 7 pH for complete neutralization if the waste water effluent were to be discharged in the environment. More base can be saved if the grinding mill system is operated at lower pH's. It must be understood that at these lower pH's all pumps, tanks, mill trunions and other apparatus of the grinding mill which contact the slurry could be rubber lined or have other types of protection from corrosion.

TABLE IV

| POUNDS OF $NH_3$ REQUIRED TO NEUTRALIZE 1000 GALLONS OF 1.49 pH ACID WASTE WATER | | |
|---|---|---|
| | 6 Minute Retention Time | |
| Degree of Neutralization | Phosphate Rock Pre-Neutralization | No Phosphate Rock Pre-Neutralization |
| 5 pH | 31 pounds | 47.5 pounds (1.53 additional) |
| | 0.13 wt. % in phosphoric acid | 0.20 wt. % in phosphoric acid |
| 6 pH | 52 pounds | 62.5 pounds (1.20 additional) |
| | 0.22 wt. % in phosphoric acid | 0.26 wt. % in phosphoric acid |
| 7 pH | 77 pounds | 102 pounds (1.32 additional) |
| | 0.32 wt. % in phosphoric acid | 0.43 wt. % in phosphoric acid |

Since the ammonia, as noted earlier, remains in solution form during the production of the phosphoric acid, it is advantageously utilized in the reaction of the ammonia with phosphoric acid in the production of diammonium phosphates. Therefore, the phosphate rock preneutralization step, to partially neutralize the pond water from a pH of about 1.8 to a pH of about 2.3 with phosphate rock, can be omitted with direct neutralization of the waste pond water with ammonia to a pH of above about 4.0 or 4.6 without utilization of the additional equipment required for the phosphate rock pre-neutralization step. However, as presented in Table IV, it requires approximately 1.2 times as much ammonia to neutralize 1000 gallons of waste pond water having a pH of 1.49 than would be required if the pre-neutralization step were used.

The following examples are presented without limitation to the particular operation defined but to further explain the specific embodiments.

EXAMPLE I

Having reference to the specific embodiment presented schematically in FIG. 1, 268 gallons per minute of acid waste water having a pH of approximately 1.8 is contacted in spiral classifier 12 with 200 tons per hour of raw phosphate rock having a particle size distribution as shown in Table III. The raw phosphate rock feed from conveyor 10 has approximately 12% water and 88% solids. A counter-flow of 44 tons (176 GPM) of acid waste water having less than about 1% solids, overflows the wier of spiral classifier 12 into line 6. The partially neutralized waste water in line 6, having a pH of about 2.3, is conveyed to line 4 where it and the unground phosphate rock of 2.3 pH discharged from the spiral classifier 12 are further neutralized using approximately 0.83 tons of lime per hour (103 pounds per 1000 gallons of acid waste water) as milk of lime from line 5 to yield neutralized waste water-phosphate rock mixture having a pH of about 6. The neutralized waste water and raw phosphate rock from spiral classifier are fed by line 4 to the grinding mill 14 at a joint feed rate to achieve a liquid-solids ratio necessary to form a ground phosphate rock slurry of 68% solids from the grinding mill 14. The ground phosphate rock slurry at a pH of 6 is then conveyed from the holding tank to a conventional attack tank or digestor 30 for contacting of the slurry with sulfuric acid to form a product slurry of phosphoric acid and crystalline hydrated calcium sulfate.

EXAMPLE II

Having reference to the specific embodiment schematically presented in FIG. 2, 200 tons per hour (dry basis) of raw phosphate rock is fed by conveyor 67 via line 69 to grinding mill 80. The raw rock has approximately 12% water. Approximately 304 gallons per minute of acid waste water (approximately 76 tons/hour) having a pH of approximately 1.8 is fed to the process via conduit 60. A portion of the acid waste water, approximately 30 gallons per minute, is fed by conduit 65 to lime mixing tank 66, to produce a milk of lime for final neutralization. Approximately 0.94 tons of lime per hour (103 pounds per 1000 gallons of acid waste water) are used to effect neutralization to a pH of 6 for the total rock slurry entering the grinding mill. The 136.5 tons per hour of partially neutralized acid waste water of an approximate pH of 2.3, and 200 tons/hour of coarse ground phosphate rock are fed to the front end of the grinding mill via conduit 62 where the remaining lime solution is added at mixing tee 72. The effluent of the grinding mill 80 at 70% solids content and 6.0 pH is separated in hydrocyclone 56 to form a coarse phosphate rock portion and a fine phosphate rock portion as above described. The coarse portion comprising approximately 200 tons/hour of rock having an approximate particle size distribution as set forth in Table III and containing 68 tons per hour of 6 pH water is conveyed to neutralization tank 58 by line 57 for mixing, with 274 gallons per minute of acid waste water from line 60. The fine portion comprising 200 tons/hour of ground phosphate rock at pH 6 and having a particle size distribution of minus 35 Tyler mesh and 103 tons/hour of water to yield a ground phosphate rock slurry of approximately 66 percent solids is then conveyed by conduit 70 to a conventional acid attack tank or digestor for contacting the slurry with sulfuric acid. Using this process approximately 304 gallons per minute of acid waste water are neutralized using a combination of phosphate rock neutralization and lime neutralization.

EXAMPLE III

Having reference to the specific embodiment schematically presented in FIG. 2 a third example is conducted. 200 Tons per hour (dry basis) of raw phosphate rock is fed by conveyor 67 via line 69 to grinding mill 80. The raw rock has approximately 12% water. Approximately 304 gallons per minute of acid waste water (approximately 76 tons/hour) having a pH of approximately 1.49 is fed to the process via conduit 60. Approximately 1.53 tons of lime per hour (168 pounds per 1000 gallons of waste water) are used to effect neutralization to a pH of 6 for the total rock slurry entering the grinding mill. The 144 tons per hour of partially neutralized acid waste water of an approximate pH of 2.9, and 200 tons/hour of coarse ground phosphate rock are fed to the front end of the grinding mill via conduit 62 where lime is added in dry form at mixing tee 72. The effluent of the grinding mill 80 at a solids content of 70% and a 6.0 pH is separated in hydrocyclone 56 to form a coarse phosphate rock portion and a fine phosphate rock portion as above described. The coarse portion comprising approximately 200 tons/hour of rock having an approximate particle size distribution as set forth in Table III and containing 68 tons per hour of 6 pH water is conveyed to neutralization tank 58 by line 57 for mixing, with 304 gallons per minute of acid waste water from line 60. The fine portion comprising 200 tons/hours of ground phosphate rock at a pH of 6 and having a particle size distribution of minus 35 Tyler mesh and 103 tons/hour of water to yield a ground phosphate rock slurry of approximately 66 percent solids is then conveyed by conduit 70 to a conventional acid attack tank or digestor for contacting the slurry with sulfuric acid. Using this process approximately 304 gallons per minute of acid waste water are neutralized using a combination of phosphate rock neutralization and lime neutralization.

EXAMPLE IV

Having reference to the specific embodiment schematically presented in FIG. 2 a fourth example is conducted. 200 Tons per hour (dry basis) of raw phosphate rock is fed by conveyor 67 via line 69 to grinding mill 80. The raw rock has approximately 12% water. Approximately 304 gallons per minute of acid waste water (approximately 76 tons/hour) having a pH of approximately 1.49 is fed to the process via conduit 60. Approximately 0.48 tons of $NH_3$ (52.6 pounds per 1000 gallons of acid waste water) per hour are used to effect neutralization to a pH of 6 for the total rock slurry entering the grinding mill. The 144 tons per hour of partially neutralized acid waste water of an approximate pH of 2.9 and 200 tons/hour of coarse ground phosphate rock are fed to the front end of the grinding mill via conduit 62 where ammonia is added at mixing tee 72. The effluent of the grinding mill 80 at a solids content of 70% and a 6.0 pH is separated in hydrocyclone 56 to form a coarse phosphate rock portion and a fine phosphate rock portion as above described. The coarse portion comprising approximately 200 tons/hour of rock having an approximate particle size distribution as set forth in Table III and containing 68 tons per hour of 6 pH water is conveyed to neutralization tank 58 by line 57 for mixing, with 304 gallons per minute of acid waste water from line 60. The fine portion comprising 200 tons/hour of ground phosphate rock at a pH of 6 and having a particle size distribution of minus 35 Tyler mesh and 103 tons/hours of water to yield a ground phosphate rock slurry of approximately 66 percent solids is then conveyed by conduit 70 to a conventional acid attack tank or digestor for contacting the slurry with sulfuric acid. Using this process approximately 304 gallons per minute of acid waste water are neutralized using a combination of phosphate rock neutralization and ammonia neutralization. For mill operation at pH of 5, only 0.286 tons of ammonia per hour is required.

EXAMPLE V

Having reference to the specific embodiment schematically presented in FIG. 3, 200 tons per hour (dry basis) of raw phosphate rock is fed by conveyor 80 via line 81 to grinding mill 83. The raw rock has approximately 12% water. Approximately 267 gallons per minute of acid waste water (approximately 67 tons/hour) having a pH of approximately 1.0 is fed to the process via conduit 84. A first portion of the acid waste water, approximately 60% and at a rate of approximately 160 gallons per minute, is fed by conduit 85 to the retention vessel 86. The remaining 40% of the acid waste water is added to the neutralization tank 78 with the coarse phosphate rock fraction being separated in hydrocyclone 87. The fine rock fraction from the hydrocyclone contains approximately 34% of the acid waste water from conduit 84 (approximately 23 tons/hour) which bypasses the base reagent neutralization step. The fine fraction is conducted to storage tank 99 via conduit 100. The coarse fraction comprising approximately 114 tons per hour of rock containing approximately 40 tons per hour of 4.5 pH water was conveyed to neutralization tank 78 for mixing with 107 gallons per minute of acid waste water (26.7 TPH) from line 88 or the remaining 40% of acid waste water. Discharge from the neutralization tank flows into a second retention vessel 89 to provide further contact between the coarse fraction of phosphate rock and the acid waste water and to allow evolution of $CO_2$. Product from retention vessel 89 flows into a final neutralization tank 90 where 737 pounds per hour of ammonia (46.2 pounds per thousand gallons of acid waste water) is added to effect neutralization to a pH of 6 for the total rock slurry entering the grinding mill 83 at a solids content of 77%. The fine fraction comprising 200 tons per hour of ground phosphate rock at a pH of 4.5 and having a particle size distribution of approximately minus 35 Tyler mesh and 94 tons per hour (TPH) of water to yield a ground phosphate rock slurry of approximately 68% solids is conveyed from storage tank 99 to a conventional acid attack tank for contacting the slurry with sulfuric acid. Using this process, approximately 267 gallons per minute of acid waste water is partially neutralized using a combination of phosphate rock neutralization and ammonia neutralization.

EXAMPLE VA

Example VA is conducted in essentially the same manner as Example V except that caustic instead of ammonia is used as the neutralizing agent. Stoichiometric equivalents of caustic (NaOH) provide similar results using equal molecular quantities. Under these conditions, caustic usage on a weight basis is 2.35 times (109 pounds per 1000 gallons of acid waste water) as much as ammonia, thus ammonia, under present conditions, is less expensive.

Although lime and caustic can be employed as neutralizing agents, caustic is preferred over lime and ammonia is particularly preferred in that not only is it less expensive, but at the low quantities employed, it stays in solution and, unlike lime or caustic, does not consume sulfuric acid reagents in the phosphoric acid attack tank by forming insoluble sulfate precipitates.

EXAMPLE VI

Having reference to the specific embodiment schematically presented in FIG. 4, 200 tons (dry basis) of raw phosphate rock is fed by conveyor 143 via line 123 to a neutralization vessel 121 (in this example a spiral classifier is used to operate as a screw conveyor and retention vessel). The raw rock has approximately 12% moisture. Approximately 66.8 TPH acid waste water having a pH of approximately 1.0 is fed to the process via conduit 111. A portion of the acid waste water, approximately 60% (40.1 TPH) is fed by conduit 107 to retention vessel 105. The remaining 40% of the acid waste water is added to the inclined screw conveyor 121 along with the raw phosphate rock and the coarse phosphate rock portion separated in hydrocyclone 117. The fine fraction from the hydrocyclone contains approximately 42% of the acid waste water from conduit 107 (approximately 28.1 tons per hour that bypasses the base reagent neutralization step). The coarse fraction comprising approximately 114 tons per hour of 4.5 pH water is conveyed to the neutralization step along with the 200 TPH of raw phosphate rock from line 123 for mixing with 26.7 TPH of acid waste water from line 125 or the remaining 40% of acid waste water. Discharge from the neutralization step flows to a final neutralization tank 129 where 651 pounds per hour of ammonia (41.2 pounds per 1000 gallons of acid waste water) is added to effect neutralization to a pH of 6 for the total rock slurry entering grinding mill 100 at a solids content of 77%. The fine fraction comprising 200 tons per hour of ground phosphate rock at a pH of 4.5 having a particle size distribution of approximately minus 35 Tyler mesh and 94 TPH of water yields a ground phosphate rock slurry of approximately 68% solids. This slurry is then conveyed by conduit 137 to a storage tank 135 and then to a conventional acid attack tank where the slurry is contacted with sulfuric acid. Using this process, approximately 66.8 TPH (267 gallons per minute) of acid waste water are partially neutralized using a combination of phosphate rock neutralization and ammonia neutralization.

EXAMPLE VII

Having reference to the specific embodiment schematically presented in FIG. 5, 200 tons (dry basis) of raw phosphate rock is fed by conveyor 106 via line 116 to a neutralization vessel 120, in this example a spiral classifier is used to operate as a screw conveyor and retention vessel. The raw rock has approximately 12% moisture. Approximately 66.8 TPH acid waste water having a pH of approximately 1.0 is fed to the process via conduit 112. A portion of the acid waste water, approximately 46% (30.9 TPH) is fed by conduit 114 to the mill product pump box 140. The remaining 54% of the acid waste water is added as a neutralization step to the inclined screw conveyor 120 along with the raw phosphate rock from line 116. Forty-six percent of the acid waste water from conduit 112 therefore completely bypasses the base reagent neutralization step. Discharge from the neutralization step (spiral classifier) flows via line 122 to a final neutralization tank 124 at a pH of 2.3 where 603 pounds per hour of ammonia (37.5 pounds per 1000 gallons of acid waste water) is added to effect neutralization to a pH of 6 for the rock slurry entering grinding mill 104 at a solids content of 76%. The ground portion comprising 200 tons per hour of ground phosphate rock at a pH of 3 and having a particle size distribution of approximately minus 35 Tyler mesh and 94 TPH of water to yield a ground phosphate rock slurry is then conveyed by conduit 109 to pump box 140. The slurry comprising the ground rock slurry and the acid waste water from line 114 and having a solids content of 68% is conveyed by line 147 to a storage tank 110 prior to being conveyed to a conventional acid attack tank where the slurry is contacted with sulfuric acid. Using this process, approximately 66.8 TPH (267 gallons per minute) of acid waste water are partially neutralized using a combination of phosphate rock neutralization before and after grinding and ammonia neutralization.

I claim:

1. A method of manufacturing wet process phosphoric acid from phosphate rock comprising the steps of (i) contacting phosphate rock containing base-forming constituents with mineral acid waste water to at least partially neutralize said acid waste water; (ii) feeding the at least partially neutralized mineral acid waste water to a grinder; (iii) grinding a mixture including phosphate rock and the at least partially neutralized mineral acid waste water in the grinder to form a slurry of ground rock; (iv) reacting ground rock of said slurry with sulfuric acid and wash water effluent of step (vi) to yield a product slurry of crystalline hydrated calcium sulfate and phosphoric acid; (v) separating crystalline hydrated calcium sulfate and phosphoric acid from the product slurry to provide phosphoric acid and crystalline hydrated calcium sulfate; and (vi) washing the crystalline hydrated calcium sulfate with an aqueous medium to obtain a wash water effluent that is passed to step (iv).

2. The method of claim 1 wherein a basic material in addition to said phosphate rock is used to neutralize the said waste water to a pH of at least about 4.0.

3. The method of claim 2 wherein the said basic material comprises lime.

4. The method of claim 2, wherein the said basic material comprises ammonia.

5. The method of claim 1 wherein the said slurry of ground rock contains about 60 to 80% by weight solids.

6. The method of claim 1 wherein said acid waste water has a pH of about 0.3 to 3.5 and a $P_2O_5$ content of about 0.01 to 3 percent.

7. The method of claim 1 wherein the $-\log_{10}(H_3O^+)$ of the said acid waste water is increased by about 10 to 30% in the contacting of step (i).

8. A method for manufacturing wet process phosphoric acid from phosphate rock comprising the steps of (i) grinding a mixture of phosphate rock containing base-forming constituents and at least partially neutralized waste water from step (iii), to form a slurry of ground rock; (ii) separating solids of said slurry of ground rock into coarser and finer portions; (iii) contacting the coarser ground rock portion with mineral acid waste water from a storage facility to at least partially neutralize said waste water; (iv) recycling said coarser ground rock portion and said at least partially neutralized waste water to said grinding step (i); (v) contacting said finer ground rock portion with sulfuric acid and wash water effluent of step (vii) to yield a product slurry of crystalline hydrated calcium sulfate and phosphoric acid; (vi) subjecting said product slurry to separation whereby crystalline hydrated calcium sulfate is separated from phosphoric acid product; (vii) washing the crystalline hydrated calcium sulfate with an aqueous medium to obtain a wash water effluent; (viii) recycling said wash water effluent of step (vii) to step (v).

9. The method of claim 8 wherein said finer ground rock portion of said slurry of ground rock of step (v) has about 60 to 80% by weight solids.

10. The method of claim 8 wherein the feed rate of coarse ground rock slurry of step (iv) to said grinding is about 10% to 350% of the feed rate of said phosphate rock.

11. The method of claim 8 wherein said acid waste water has a pH of about 0.03 to 3.5 and a $P_2O_5$ content of about 0.01 to 3 percent.

12. The method of claim 8 wherein the $-\log_{10}(H_3O^+)$ of the said acid waste water is increased by about 10 to 30% in the contacting of step (v).

13. The method of claim 8 wherein a basic material in addition to said ground rock is used to neutralize the said waste water to a pH of at least about 4.0.

14. The method of claim 13 wherein the said basic material comprises lime.

15. The method of claim 13 wherein the said basic material comprises ammonia.

16. The method of claim 15 wherein the resulting phosphoric acid product contains about 0.05 to 0.4 weight percent ammonia.

17. A method of manufacturing wet process phosphoric acid containing about 0.05 to about 1 weight percent ammonia from phosphate rock comprising the steps of (i) contacting phosphate rock containing base-forming constituents with mineral acid waste water from a storage facility to partially neutralize said acid waste water; (ii) further neutralizing the partially neutralized acid waste water with ammonia to a pH of at least about 4.0; (iii) feeding the further neutralized mineral acid waste water to a grinder; (iv) grinding a mixture including phosphate rock and the further neutralized mineral acid waste water in the grinder to form a slurry of ground rock; (v) reacting ground rock of said slurry with sulfuric acid and wash water effluent of step (vii) to yield a product slurry of crystalline hydrated calcium sulfate and phosphoric acid; (vi) separating crystalline hydrated calcium sulfate and phosphoric acid from the product slurry to provide phosphoric acid and crystalline hydrated calcium sulfate; and (vii) washing the crystalline hydrated calcium sulfate with an aqueous medium to obtain a wash water effluent that it passed to step (v).

18. The method of claim 17 wherein the ammonia used to neutralize the said waste water to a pH of at least about 4.0 is anhydrous ammonia.

19. A method of manufacturing wet process phosphoric acid from phosphate rock comprising the steps of (i) contacting mineral acid waste water from a storage facility with phosphate rock containing base-forming constituents for a sufficient duration to at least partially neutralize said acid waste water; (ii) feeding the at least partially neutralized acid waste water and the phosphate rock along with fresh water to a grinder; (iii) grinding a mixture of the at least partially neutralized acid waste water, the fresh water and the phosphate rock to form a slurry of ground rock; (iv) reacting the ground rock of said slurry with sulfuric acid and wash water effluent of step (vi) to yield a product slurry of crystalline hydrated calcium sulfate and phosphoric acid; (v) separating crystalline hydrated calcium sulfate and phosphoric acid from the product slurry to provide phosphoric acid and crystalline hydrated calcium sulfate and (vi) washing the crystalline hydrated calcium sulfate with an aqueous medium to obtain a wash water effluent that is passed to step (iv).

20. The method of claim 17 wherein the phosphoric acid product is used to produce diammonium phosphate.

21. A method of manufacturing wet process phosphoric acid from phosphate rock comprising the steps of (i) contacting phosphate rock containing base-forming constituents with a first portion of mineral acid waste water to at least partially neutralize said acid waste water; (ii) feeding the phosphate rock and the at least partially neutralized first portion of mineral acid waste water to a grinder; (iii) grinding a mixture including the phosphate rock and said first portion of mineral acid waste water in the grinder to form a slurry of ground rock; (iv) reacting ground rock of said slurry with sulfuric acid, wash water effluent of step (vi) and a second portion of mineral acid waste water to yield a product slurry of crystalline hydrated calcium sulfate and phosphoric acid; (v) separating crystalline hydrated calcium sulfate and phosphoric acid from the product slurry to provide phosphoric acid and crystalline hydrated calcium sulfate; and (vi) washing the crystalline hydrated calcium sulfate with an aqueous medium to obtain wash water effluent that is passed to step (iv).

22. The method of claim 21 wherein a basic material in addition to said phosphate rock is used to neutralize the said waste water to a pH of at least about 4.0.

23. The method of claim 22 wherein the said basic material comprises lime.

24. The method of claim 22, wherein the said basic material comprises ammonia.

25. The method of claim 21 wherein the said slurry of ground rock in step (iv) contains about 60 to 80% solids.

26. The method of claim 21 wherein said acid waste water has a pH of about 0.3 to 3.5 and a $P_2O_5$ content of about 0.01 to 3 percent.

27. The method of claim 21 wherein the $-\log_{10}(H_3O^+)$ of the said acid waste water is increased by about 10 to 30% in the contacting of step (i).

28. The method of claim 21 wherein the contacting time for step (i) is sufficient to allow the evolution of gases formed during said contacting.

29. A method for manufacturing wet process phosphoric acid from phosphate rock comprising the steps of (i) grinding a mixture of phosphate rock containing base-forming constituents and an at least partially neutralized first portion of waste water from step (iii), to form a slurry of ground rock; (ii) separating solids of said slurry of ground rock into coarser and finer portions; (ii) contacting said coarser ground rock portion with said first portion of mineral acid waste water to at least partially neutralize said first portion of waste water; (iv) recycling said coarser ground rock portion and said at least partially neutralized waste water to said grinding step (i); (v) contacting said finer ground rock portion with sulfuric acid and wash water effluent of step (vii), and a second portion of mineral acid waste water to yield a product slurry of crystalline hydrated calcium sulfate and phosphoric acid; (vi) subjecting said product slurry to separation whereby crystalline hydrated calcium sulfate is separated from phosphoric acid product; (vii) washing the crystalline hydrated calcium sulfate with an aqueous medium to obtain a wash water effluent; (viii) recycling said wash water effluent of step (vii) to step (v).

30. The method of claim 29 wherein said fines portion of said slurry of ground rock of step (v) has about 60 to 80% solids.

31. The method of claim 30 wherein said finer ground rock portion of said slurry of ground rock of step (v) has about 60 to 80% solids.

32. The method of claim 29 wherein said acid waste water has a pH of about 0.03 to 3.5 and a $P_2O_5$ content of about 0.01 to 3 percent.

33. The method of claim 29 wherein the $-\log_{10}(H_3O^+)$ of the said acid waste water is increased by about 10 to 30% in the contacting of step (iii).

34. The method of claim 29, wherein the contacting time for step (iii) is sufficient to allow the evolution of gases formed during said contacting.

35. The method of claim 29 wherein a basic material in addition to said ground rock is used to neutralize the said waste water to a pH of at least about 4.0.

36. The method of claim 35 wherein the said basic material comprises lime.

37. The method of claim 35 wherein the said basic material comprises ammonia.

38. The method of claim 37 wherein the resulting phosphoric acid product contains about 0.05 to 0.4 weight percent ammonia.

39. The method of claim 11 wherein the acid waste water has a pH of about 1.4 to 1.9 and a $P_2O_5$ content of 1 to 2 percent.

40. The method of claim 13 wherein the waste water is neutralized to a pH of at least about 4.6.

41. The method of claim 16 wherein the phosphoric acid product contains about 0.05 to 0.4 weight percent ammonia.

42. The method of claim 17 wherein the phosphoric acid contains about 0.1 to 1 weight percent ammonia.

43. The method of claim 18 wherein the waste water is neutralized to a pH of at least about 4.6.

44. The method of claim 19 wherein the waste water is neutralized to a pH of at least about 4.6.

45. A method for wet grinding phosphate rock with a phosphate rock-compatible, mineral acid water in corrosion-susceptible milling media to produce a processable phosphate rock slurry comprising preliminarily at least partially neutralizing the mineral acid water by contacting the mineral acid water with phosphate rock containing base-forming constituents to increase the pH of the acid water and render it less corrosive on the milling media, and milling phosphate rock with the at least partially neutralized acid water in the milling media to increase the surface area of rock and produce a processable slurry of finer particles of phosphate rock.

46. The method of claim 45 wherein the mineral acid water is a mineral acid waste water produced in the manufacture of wet process phosphoric acid, and the milling media is grinding media.

47. The method of claim 46 wherein the phosphate rock includes substantial amounts of phosphate rock particles which have been increased in surface area to increase the pH of the mixture.

48. The method of claim 47 wherein the processable slurry is separated into a coarse fraction and a fine fraction, and the coarse fraction provides the phosphate rock particles which have been increased in surface area.

49. The method of claim 46 including further neutralizing the mineral acid water with ammonia, caustic or lime prior milling.

50. The method of claim 49 wherein the further neutralizing agent includes ammonia.

51. The method of claim 48 including further neutralizing the mineral acid water with ammonia, caustic or lime.

52. The method of claim 51 wherein the further neutralizing agent includes ammonia.

53. A method of claim 46 wherein phosphate rock containing base-forming constituents is contacted with a first portion of mineral acid waste water to at least partially neutralize said acid waste water; the partially neutralized mixture of phosphate rock and said first portion of mineral acid waste water is ground to form a slurry of ground rock; and the ground rock slurry is reacted with sulfuric acid and water from a second portion of mineral acid waste water to produce a phosphoric acid product.

54. The method of claim 53 including further neutralizing the mineral acid water with ammonia, caustic or lime.

55. The method of claim 54 wherein the acid water is partially neutralized to a pH of at least about 4.

56. The method of claim 54 wherein the neutralizing agent includes ammonia.

57. The method of claim 54 wherein the said slurry of ground rock contains about 60 to 80% solids.

58. The method of claim 54 wherein said acid waste water has a pH of about 0.3 to 3.5 and a $P_2O_5$ content of about 0.01 to 3 percent.

59. The method of claim 53 wherein the phosphate rock slurry from the grinding media is combined with water from a second portion of acid water to form a resulting slurry and ground rock and said resulting slurry is reacted with sulfuric acid to produce phosphoric acid.

60. The method of claim 59 wherein the solids of said resulting slurry of ground rock is separated into coarser and finer portions; the coarser ground rock portion is contacted with the first portion of mineral acid waste water to at least partially neutralize said waste water; the coarser ground rock portion and said at least partially neutralized waste water are recycled to the grinding step; and the finer ground rock portion is contacted with sulfuric acid to produce phosphoric acid.

* * * * *